United States Patent
Frommer et al.

[11] Patent Number: 5,110,479
[45] Date of Patent: May 5, 1992

[54] WATER PURIFICATION SYSTEMS

[76] Inventors: Moshe A. Frommer, 2a Eisenberg Street, Rehovot; Israel Dalven, 28/8 Chatam Sofer Street, Emanuel, both of Israel

[21] Appl. No.: 759,849

[22] Filed: Sep. 16, 1991

Related U.S. Application Data

[63] Continuation of Ser. No. 457,243, Dec. 27, 1989.

[30] Foreign Application Priority Data

Dec. 30, 1988 [IL] Israel ............ 88844
Apr. 25, 1989 [IL] Israel ............ 90084

[51] Int. Cl.⁵ .................. B01D 15/04; B01D 35/143
[52] U.S. Cl. ........................ 210/662; 210/85; 210/93; 210/96.1; 210/282; 210/290
[58] Field of Search .......... 210/282, 266, 290, 93, 210/94, 95, 96.1, 96.2, 85, 662

[56] References Cited

U.S. PATENT DOCUMENTS

| | | | |
|---|---|---|---|
| 2,749,307 | 6/1956 | Ellison | 210/94 |
| 2,761,833 | 9/1956 | Ward | 210/94 |
| 2,778,798 | 1/1957 | Klumb et al. | 210/94 |
| 2,781,312 | 2/1957 | Klumb et al. | 210/94 |
| 3,327,859 | 6/1967 | Pall | 210/266 |
| 3,355,018 | 11/1967 | Smith | 210/94 |
| 3,841,484 | 10/1974 | Dominick | 210/266 |
| 4,287,057 | 9/1981 | Stanley | 210/282 |
| 4,368,123 | 1/1983 | Stanley | 210/282 |
| 4,382,862 | 5/1983 | Dillman | 210/282 |
| 4,474,620 | 10/1984 | Hall | 210/282 |
| 4,635,663 | 1/1987 | Rollins et al. | 210/282 |
| 4,681,677 | 7/1987 | Kuh et al. | 210/94 |
| 4,713,175 | 12/1987 | Bray | 210/266 |
| 4,769,143 | 9/1988 | Deutsch et al. | 210/266 |
| 4,800,018 | 1/1989 | Moser | 210/266 |
| 4,826,594 | 5/1989 | Sedman | 210/282 |
| 4,894,154 | 1/1990 | Roz et al. | 210/290 |
| 4,897,187 | 1/1990 | Rice | 210/266 |
| 4,913,808 | 4/1990 | Hague | 210/93 |
| 4,927,539 | 5/1990 | Stevens et al. | 210/656 |

Primary Examiner—Stanley S. Silverman
Assistant Examiner—Cynthia L. Nessler
Attorney, Agent, or Firm—Edwin D. Schindler

[57] ABSTRACT

Means are provided for use with water purification systems and for evaluating the quality of water, which impart a color to water passing through such means, said color being indicative of an excess of a certain ionic strength or of a change of pH beyond a predetermined value.

There is also provided a highly efficient water purification system for the removal of a wide variety of contaminants, also equipped with a color release system when purification starts to fail.

8 Claims, 3 Drawing Sheets

WATER PURIFICATION SYSTEMS

This application is a continuation of application Ser. No. 07/457,243, filed Dec. 27, 1989.

FIELD OF THE INVENTION

The invention relates to water purification means, providing potable water. There are further provided means for indicating exhaustion of the purification capacity, imparting an easily discernible color to the water coming from the purification device. There is further provided a device for the essentially complete removal of a wide variety of contaminants, such as nuclear contaminants, toxic substances and other undesirable substances equipped with such color indicating means. Such device may be provided in the form of two separate units which are attached with each other before use.

BACKGROUND OF THE INVENTION

There exists a need for water purification devices, for use by campers, travellers and the like on the one hand, and for use in certain emergencies, such as nuclear accidents, release of accidental or intended nature of poisonous substances and the like. Thus, there exists a need for the nearly absolute removal of noxious and nuclear contaminants, and also a need for the provision of potable water from contaminated water sources. One of the existing problems is the reliable indication whether the purification system is still fulfilling its task or not; such devices have a limited purification capacity, and the exhaustion of these must be indicated in a reliable manner. Many existing purification systems use ion exchange resins, in combination with active charcoal filters, mechanical filters, etc. It is conventional to incorporate means for changing the color of the resin when the capacity of the purifier to effect water purification becomes exhausted. Such color change of resins is disclosed amongst others in U.S. Pat. No. 2,935,194 and U.S. Pat. No. 980,335.

Water contamination is a serious problem, and this has been demonstrated on a large scale by the Tchernoville nuclear accident, by the accidental release of poisons into the Rhine, by the large scale contamination of rivers and lakes by nitrates and also by effluents of chemical industry, and also by pesticides, and the like.

Reliable and easily perceived indication of the exhaustion of the purification capacity of a purification device for the provision of potable water is of great importance. According to the invention such means are provided, based on the coloring of the water issuing from the device when this is not purified to the required degree of purity. This may be used with any water purification system and for water purity testing. Furthermore, it is of importance to provide water purification means which can be stored over prolonged periods of time and which can instantly be used when required. Such means, in the form of kits of two units, which have to be attached to each other, are provided according to this invention. Such purification devices are provided with color indicators of the type defined above.

SUMMARY OF THE INVENTION

The invention relates to improved water purification means. It relates to purification devices comprising means for imparting an easily perceptible color to the purified water upon exhaustion of the exchange resin, as soon as the purification fails to be of the required efficacy. Furthermore, the invention relates to the provision of highly efficient purification systems for the essentially complete removal of harmful contaminants, including nuclear contaminants, poisonous substances, bacteria, etc.

Such units can be provided in the form of two-component kits which can be stored for prolonged periods of time, and which can be easily assembled for immediate use. Advantageously, these too are provided with color indicating means indicative of failure of the system to provide the required degree of purification. In the systems of the invention, the exhaustion of the ion exchange resin is assumed to be the limiting factor, indicative of the performance of the entire system. This assumption is a sound one as the capacity of the resin is generally lower than that of active carbon, of mechanical filters, etc. The device for the essentially complete removal of contaminants, in kit form, is designated as Universal Water Purification Kit (UWPK). The colors imparted to water after passage through the purification systems, after partial failure of the purification capability, are of the food grade type and can be ingested without harm. It is clear that once such coloring appears, this is indicative that the water may not be fit for drinking or cooking and ought not be consumed. Further features of systems of the invention are gravity feed, eliminating the requirement of a power source, long shelf-life and rapid readiness for operation. The size of the units can be varied at will, according to the required purification capacity.

An indicative dye is provided on a suitable substrate, and as long as the effluent water has the required purity, the dye will stay bound to the substrate. When purification deceases the substrate-bound dye is contacted by water of a different pH, or which contains certain ions, above a predetermined concentration, and this results in the gradual release of the dye, imparting a warming color to the water emerging from the purification system.

The absolute purification systems comprise a combination of highly efficient purification means, such as effective filters, active charcoal, ion exchange resins, etc. As set out hereinafter, such contamination device is advantageously provided in the form of a two-part system, which parts are stored separately, and which are attached to each other when the system is to be used.

The present invention encompasses means for detecting changes in pH or ion concentration in a flowing aqueous stream. This involves passing the stream over a dye absorbed on a substrate. During the normal operation of the system, at acceptable levels of pH or ion concentration, the dye remains bound to the substrate. When the pH or ion concentration rises (or, in some cases, the pH decreases), the dye is solubilized and becomes visible in the water stream.

The substrate can be an ion exchange resin containing charged groups, such as quaternary ammonium groups, free amines, carboxylic or sulfonic acid groups. Usually such charged groups are bound to styrenic or acrylic chains, and the physical structure of the resin is either gel or macroreticular. The dyes are charged, colored, water soluble species. Examples are acidic and mordant azo dyes, especially mono azo, acidic and basic triarylmethane dyes, basic xanthene dyes, basic acridine dyes, basic indamine dyes, basic azine dyes, acidic anthraquinone dyes and acidic indigoid dyes, as described in the Color Index and as known to those skilled in the art. They may be monomeric or polymeric in nature.

It is generally advantageous to chose acidic dyes having no cationic functionalities and basic dyes having no anionic groups, but the invention is not limited to such materials.

Acidic dyes, i.e. those having an excess of sulfonic or carboxylic groups, are bound on basic resins, i.e. those having free base or quaternary ammonium groups in the hydroxyl form. It is generally advantageous to acidify the dye before combining it with the resin. In the case of a weak base resin, this is necessary to accomplish the binding. The acidification is conveniently accomplished by passing an 0.2%-10% solution of the dye slowly through a strong acid ion exchange resin containing at least 5-fold excess of capacity.

The acidified dye solution is then stirred for several hours with the resin until the dye is absorbed. The loading can be 0.1% to 60% of the theoretical capacity, but is usually about 40%. Not every combination of acid dye and base resin permits high binding capacity.

Generally, weak base resins enable attainment of higher sensitivity to changes in pH and in ion concentration in the stream, then do strong base resins. Among the weak base resins, acrylic resins appear to give weaker binding of the dye than styrenic, and therefore higher sensitivity. Basic dyes can be bound on acidic resins, and should first be transferred to the hydroxyl form by passing through a strong base ion exchange column, in analogy to the method described above for acidic dyes.

Alternatively, the substrates can be a neutral adsorbent such as neutral alumina, diatomaceous earth (Cellite), or bentonite. In that case, the dye must be a water insoluble salt (lake), such as an alumina, calcium, barium, chromium or iron salt of an acid dye. The preferred choice in an aluminum salt extended on granular, porous alumina. The dye may be as little as 0.1% or as much as 40% of the weight of the mixture, insoluble dye-alumina adsorbent, but is conveniently between 1 and 6%. The acidic dyes on substrates comprising weakly basic ion exchange resins or their insoluble salts on alumina adsorbent are particularly sensitive to pH above 7. Extreme sensitivity of ions in the deionized water stream, can be obtained by passing the purified (D.I.) water stream through a bed of strong base resin before contacting the layer containing the dye-substrate combination. By this method ion content of as low down as 4 ppm in the D.I. water (as measured, e.g. by electrical conductivity) can be visually detected by color changes. When used in conjunction with the Universal Water Purification device (UWP) described below, such a sensitivity to ion content (4 ppm) implies capability of detecting the lowering of the purification efficiency of the kit to 99% of its original efficiency in case the purified drinking water source contains 400 ppm TDS. If the D.I. purified water stream is not passed through a basic ion-exchange pretreatment before contacting the dye-substrate combination sensitivity to changes of the ion content of the purified water is lower and sensitiveness to salt concentrations from 100 to 10,000 ppm can be obtained depending on the choice of the dye and the substrate. The color indicators described above are especially suitable to be incorporated in a water purifier containing a mixed bed ion exchange resin removing excess salts or noxious ionic impurities to produce potable water. Such a device advantageously contains a strong adsorbent to remove hazardous organic chemicals, unpleasant tastes and odors. A further option is a microbiocide, killing microbes on contact. Furthermore, microfilters can be included to exclude suspended particles, including radioactive dust. Mixed bed ion exchanger is capable of reducing ionic concentration to an extremely low level. When the capacity for absolute ion removal is saturated, the ion concentration will rise sharply. If a quantity of strong base resin is positioned after the mixing bed ion exchanger and if the mixed bed has been formulated to provide pH neutrality, then the pH of the effluent water will rise sharply as well. Sulfonic acid dyes adsorbed on weak base resins or their lakes extended on neutral alumina respond to elevated pH levels by deadsorbtion thereby coloring the effluent water in proportion to the hydroxyl ion strength (pH). The use of strong base resin "activator" is needed because the anions present in the water after ion "breakthrough" are generally ions weakly held on anion exchange resins such as chloride, which are ineffective in displaying dyes, even from neutral adsorbants such as alumina. Preferred embodiments of the invention includes a combination of edible dye and weak base ion exchange adsorbant with moderate sensitivity towards increases in pH, but other combinations may be used. The sulfonic acid dyes indigo carmine, allura red, sunset yellow, tartrazine and brilliant blue, are preferable due to their wide regulatory agency approval, but any acid dye, approved for food use, may be used. While weak base, macroreticular, styrenic resins such as Amberlyst A-21 are preferred gel and acrylic weak base resins can readily be used, giving somewhat greater sensitivity. The dye loading on the resin can vary widely from 0.1% to 50% w/w, but is usually between 5 and 25% with 15-20% particularly convenient.

High sensitivity to the ion breakthrough point is neither necessary nor desirable, since the ion exchange material even in its saturated form will readily exchange and adsorb heavy metal toxic on radioactive ions and release harmless sodium and chloride ions. Thus the color indicator provides the user with a safety buffer of sufficient capacity to fully assure the potability of the effluent water, even after the edible dye has been released. In the preferred embodiments discussed above, an intense color is developed well before the rise in pH is noticeable to the human palate.

In mixed bed ion exchange desalination practice, it is common to sue an excess of acidic resin capacity, since ground waters are commonly basic, containing bicarbonate ions. This practice increases the capacity of the resin for absolute ion removal. In the present invention, the saturation of the resin is carried considerably further, which would, under normal practice result in acidic affluents, which would neutralize the added strong base resin activator and eliminate the pH rise needed to deadsorb the edible dye. Thus the mixed bed resin used in the present invention must be formulated to provide a neutral solution upon saturation.

As a general rule, the additional strong base resin should be about 7% of the volume of the total mixed bed. Since naturally acidic waters are usually unbuffered (unless heavily polluted with phosphates) this quantity is usually sufficient to provide a pH rise and its accompanying intense color release. The quantity of SBR may be increased to 10% for use with highly acidic waters or reduced to 5% for use with basic waters. A particularly desirable option is the inclusion in the purifier of an activated carbon layer to remove organic contaminants, unpleasant odors, tastes and chlorine. The use of granular carbon of mesh size 8 t 100 is normal with 12 to 50 mesh preferred. The inclusion of bacteriostatic silver in amounts greater than 0.025% is highly preferred to prevent bacterial growth in the carbon after being wetted.

The preferred embodiment of the present invention is an absolute purifier of purifying clean water from a fresh or brackish water source. To this end is optionally included a disinfectant which kills on contact bacteria, viruses and protazoa capable of causing disease and disability. Such materials are generally known as iodated resins, and are made according to various formulations as is known to those skilled in the art.

One such particularly preferred formulation includes $I_2Cl^-$, $I_3^-$ and $IBrCl^-$ ions adsorbed on strong base ion exchange granules. The present invention is not limited to including any particular type of dry disinfectant or indeed any disinfectant at all. Other preferred embodiments may include resins incorporating $I_5^-$ or $I_2 I_3^-$ species. Iodate resins of all their types are advantageous in that they are of the demand type, releasing little or no iodine into the water until contact with organic matter is made. They are capable of devitalizing bacteria, almost regardless of the challenge concentration, within seconds. Viruses and protazoic cysts are somewhat more resistant.

The present invention optionally and preferably includes porous filters to remove suspended particles. Especially effective are porous asymmetric polyethylene filters available from the Porex Corporation and from the Chromex corporations of the United States. Dense polyurethane foams of 0.25–0.3 g/cc are also very effective. The use of graded porosities is known in the art to increase dirt holding capacity and prevent blinding. In the preferred embodiment employing iodated disinfectants, polyurethane foams must not be used in contact with said disinfectants.

While any ordering of the various adsorbant layers of the preferred embodiment can be used, and falls within the scope of the invention, it is preferable to position the adsorbent layers so that the mixed bed resin follows the disinfectant layer so as to remove any iodide ions released. To assure maximum potability of the water, it is also preferred to position the activated carbon or other strong adsorbent after the disinfectant layer as well.

On the other hand, it is necessary that the color indicator, including the basic resin activator and the dye adsorbed resin, be placed after the various adsorbents so as not to cause the dye or excess hydroxyl ions to be adsorbed.

It is well known in the art, that ion exchange resins must be stored in the moist state. Drying the resins can lead to their becoming inactive until rehydrated, which process is not rapid. Activated carbon is best stored dry and the iodated disinfectant may be stored in either state. It is therefore convenient to divide the purifier into two housings, one sealed to include moisture and one to exclude moisture. This is not, however necessary and a single sealed housing may be used with sufficient moisture to maintain the mixed bed resin in a humid state. When two housings are used, they are provided with a convenient means of attachment, such as screw threaded or smooth snap connectors or a flexible tube, clamped closed during storage.

It is well known that the effectiveness of an adsorbent is conditional on sufficient contact time with the flowing stream containing the impurities. The intensity of the color imparted to the effluent stream by the color indicator, is also strongly affected by contact time. Since the adsorbents are advantageously commercial and standard materials of fixed size granules, contact surface is determined by the volume of the adsorbents with the stipulation of sufficient bed depth to allow good mixing and contact. The factors governing desalination by mixed bed ion exchangers are well known to those skilled in the art and require a contact time of from 0.6 to 7.5 minutes. Since desalination is the lowest capacity adsorbent contemplated for use in the purifier, it is advantageous to reduce the flow rate to increase contact time as much as practical. Experience has shown that a one-minute contact time is preferred. For example, for a flow rate of 60 to 75 ml/min, a mixed bed resin volume of 150 ml is required. Similarly, should activated carbon be included in the purifier, it must be present in such quantity to provide a one minute minimum contact time to effectively remove noxious organic chemicals.

The iodated disinfectant resin included in the preferred embodiment is highly effective against bacteria, providing complete kill in several seconds. However, to ensure protection against viruses and protazoic cysts, a longer contact time is preferable, but more than 30 sec. is unnecessary.

In the embodiment of the present invention utilizing a flow rate of 60–75 ml/min, it has been determined that a minimum contact time of 1 second is sufficient to deadsorb sufficient dye from the preferred color indicator formulation described above. This on the condition that a minimum bed depth of 3 mm is maintained. These conditions are merely preferred and effective embodiments, but the invention is in no way limited to this or other variation, but rather only the limitations imposed in the appended claims determine the scope of the invention.

While any means may be used to control the flow rate within the scope of the present invention, such as a hole of controlled size or a series of slits in a device designed not to be easily blinded by dirt or by a filter of selected, appropriate water resistance, it is most desirable to use a carbon filter placed after the ion exchange resinous material. Such a filter both regulates flow and adsorbs any chemical impurities thrown by the ion exchange materials. Such filters are available from the American Cyanamid Co. and from Purification Products Ltd. of England in a wide variety of flow characteristics.

Since activated carbon contains carbon fines which are raised free of the granules during operation, especially upon first contact with water, it is desirable to include a depth filter capable of removing them so as not to blacken the effluent water. In the embodiments of the invention including a carbon filter or other fine filter, inclusion of such a depth filter is required, so as not to cause the blinding of the fine filter and concurrent severe reduction of flow. Fine polyethylene or polyurethane sponges have been found satisfactory.

Hydrophillic asymmetric polyethylene filters of 2514 35 u, specification available from the Porex Co. have been found especially suitable. The feed water may be supplied by any means, the invention not being limited in regards to this. It should be realized, however, that the effectiveness of the invention in purifying water is dependent on use of the appropriate flow rate. Use of a mechanical pump to supply inlet water, requires use of a higher resistance flow controller such as a finer filtration system, removing smaller suspended impurities while maintaining the proper flow rate.

EXAMPLES

Example 1

Figure 1:
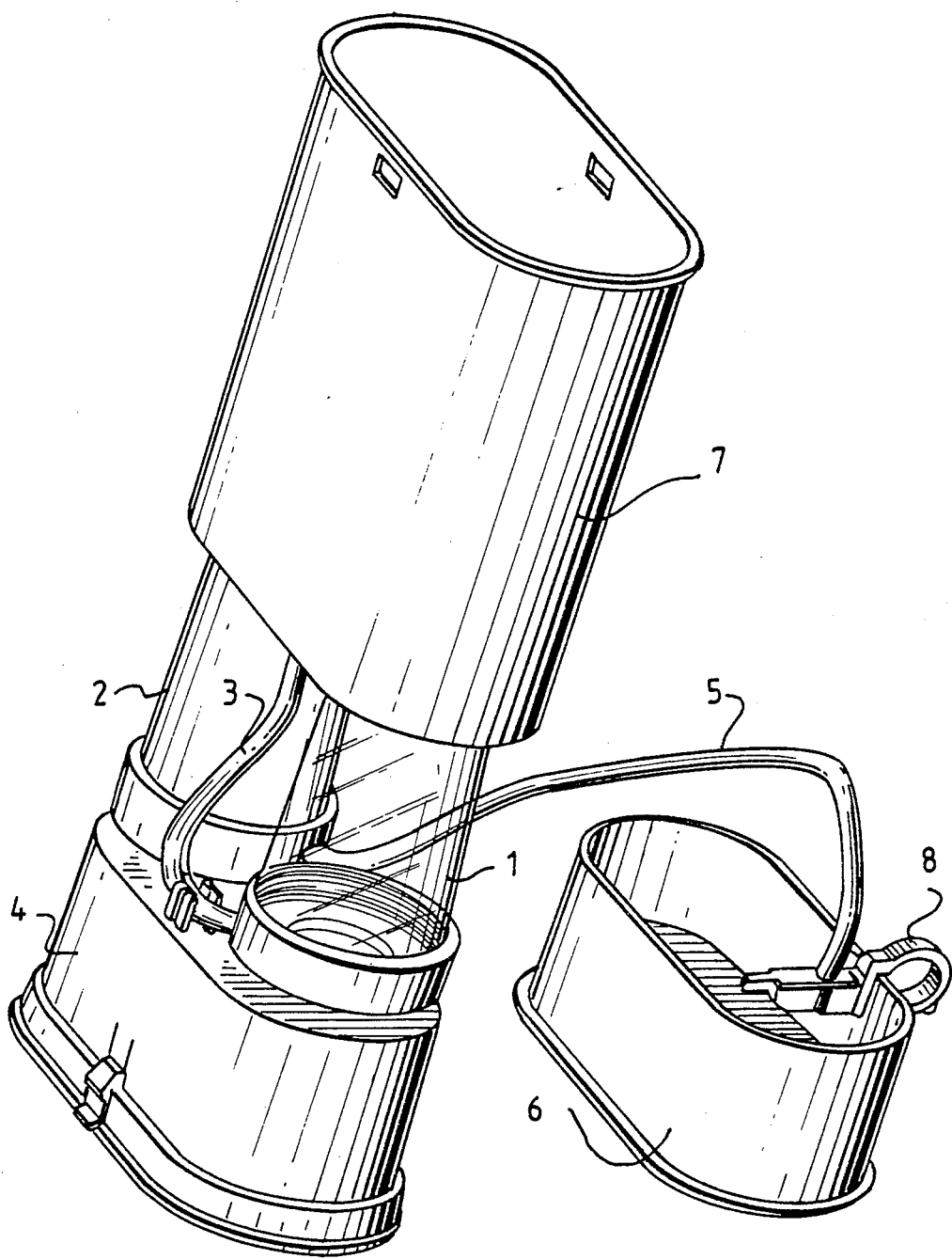
FIG. 1 is a perspective view of the preferred embodiment of the invention.

Aluminum salt of "brilliant blue" was prepared by combining 50 mg of the dye (FD&C blue #1, C.I. 42090) and 5 gr of aluminum oxide (neutral grade, 150 mesh). A solution of 25 mg hydrated aluminum nitrate in 5 ml of water, was added quickly to the dry mixture and mixed vigorously. The colored alumina was isolated by vacuum filtration, rinsed with D.I. water and dried at 70° C. Specially washed Strong Base Resin (SBR) was prepared by stirring slowly 100 g of commercial type I strong base ion-exchange resin (Amberlite IRA 400, Bayer M500 etc.) in the hydroxyl form with D.I. water at 60° C. for ½ hr. The excess water was decanted and the resin stirred for 10 minutes with 95% ethanol at 60° C. The resin was isolated by filtration and rinsed with deionized water.

0.5 g of the alumina-dye mixture was layered below 1 g of the specially washed resin, separated by poly-urethane foam. When deionized water having a conductivity of $0.8\mu$ mhos/cm was passed through the layers at about 65 ml/min, an essentially colorless stream was obtained. When the D.I. feed water was mixed with tap water (cond. 1 $\mu$S/cm) to 1% tap water (conductivity rising to 13$\mu$ $\mu$S/cm), the stream received a noticeable blue color.

Example 2

As example 1, but 50 mg Ponceau 4R (E 124, C.I. 16255) and 50 mg hydrated aluminum nitrate were used. The effluent passed first over SBR became noticeably red when the conductivity reached about 30$\mu$ $\mu$S/cm, or about 20 ppm, TDS.

Example 3

5 g neutral alumina were combined as in Example 1, with 250 mg Sunset Yellow (E 110, C.I. 15985) and with 200 mg hydrate aluminum nitrate. When deionized water was passed over the alumina-dye lake no color developed, but noticeable color appeared with tap water diluted to 50% with D.I. water having a conductivity of about 500$\mu$ $\mu$S/cm.

Example 4

A solution of 0.80 g Allura Red (FD&C #40, C.I. 16035) in 10 ml of water was slowly poured over a 10 cm high ion-exchange column containing 10 ml of IR-120 (H+). The column was carefully rinsed with a minimum volume of D.I. water and all colored portions were added to 6 ml of IRA-67 (weak base, acrylic, gel resin). The mixture was gently stirred at 40° C. until the dye was fully absorbed. The resin was rinsed and excess water drained.

The resin was layered below specially washed SBR (see example 1). When D.I. water was passed over the layers, the water stream was colorless. Increasing the ion content in the water stream by adding tap-water to provide a conductivity of about 30$\mu$ $\mu$S/cm, imparted a strong red color into the water.

Example 5

3 ml of Dow resin type MSA-2 (OH−) (strong base, type II, macroreticular) and 200 mg of Brilliant Blue sodium salt were combined and stirred for 2 hrs. The supernatant blue liquid was decanted and mixed with 1 ml of IR-120 resin (Rohm Haas) in the acid form for 5 min. and then the supernatant liquid was returned to the MSA resin. After stirring 1 hr and rising thoroughly with D.D. water, no color was further eluted. Sea water (50 mS/cm cond.) of 25 mS/cm developed a slight blue color whereas at 50 mS/cm a strong blue color appeared.

EXAMPLE 6

A solution of 300 mg of basic fuchsin (Rosanalin, C.I. 42510) in 150 ml of water was passed over a column containing 10 ml of IRA-400 (strong base resin) and stirred several hours with 6 ml of IRC-50 (weak, acid, macroreticular, acrylic resin). The supernatant dye was decanted and the resin was rinsed thoroughly. When layered below a strong acid resin, sea water diluted with deionized (D.I.) water to 20%, was capable of eluting a noticeable magenta color.

Example 7

0.8 g of carmoisine (E 122, C.I. 14720) were acidified as in example 4, and combined with 7.5 ml of Amberlyst A-21 (weak base, styrenic, macroreticular) ion exchange resin. The mixture was stirred gently at 40° C. until the dye was fully absorbed and the supernatant solution almost colorless. When treated with D.I. water adjusted with NaOH solution to pH 10, no color was developed. At pH 10.5, very faint color was visible, but strong color was developed when the D.I. water was adjusted to pH 11 with NaOH solution, becoming progressively more intense to pH 13.

EXAMPLE 8

0.9 g indigo carmine (FD&C blue #2, E132, CI 73015) dissolved in 110 ml of water at 40° C., is acidified by a passing over column containing 10 ml of strong acid ion exchange resin, Amberlite IR120. The column was rinsed with a minimum of deionized water and the colored portions were stirred with 15 ml of amberlyst A-21 weak base styrenic macroreticular resin largely for several hours and the resulting resin was then rinsed with D.I. water. When tested in a manner similar to that of examples 1 and 4 noticeable color appeared when water of conductivity 100 $\mu$S/cm was passed over the SBR and dyed resin layers. Color was weakly eluted by a pH 9.2 borax buffer, but a pH 12 buffer developed very strong color rapidly.

Example 9

A 1% w/w solution of Poly-R 478 (Dynapol Corp.) was acidified by passing through a column containing a large excess of strong acid ion exchange resins and set in contact with Amberlyst A-21 weak base macroreticular resin beads for 24 hrs at 40° C. The colorless excess solution was decanted and the beads rinsed with de-ionized water. Very weak color was eluted from the resin by a pH 12 phosphate buffer, but 0.1 N NaOH eluted the dye giving a violet colored solution.

Example 10

Figure 2:
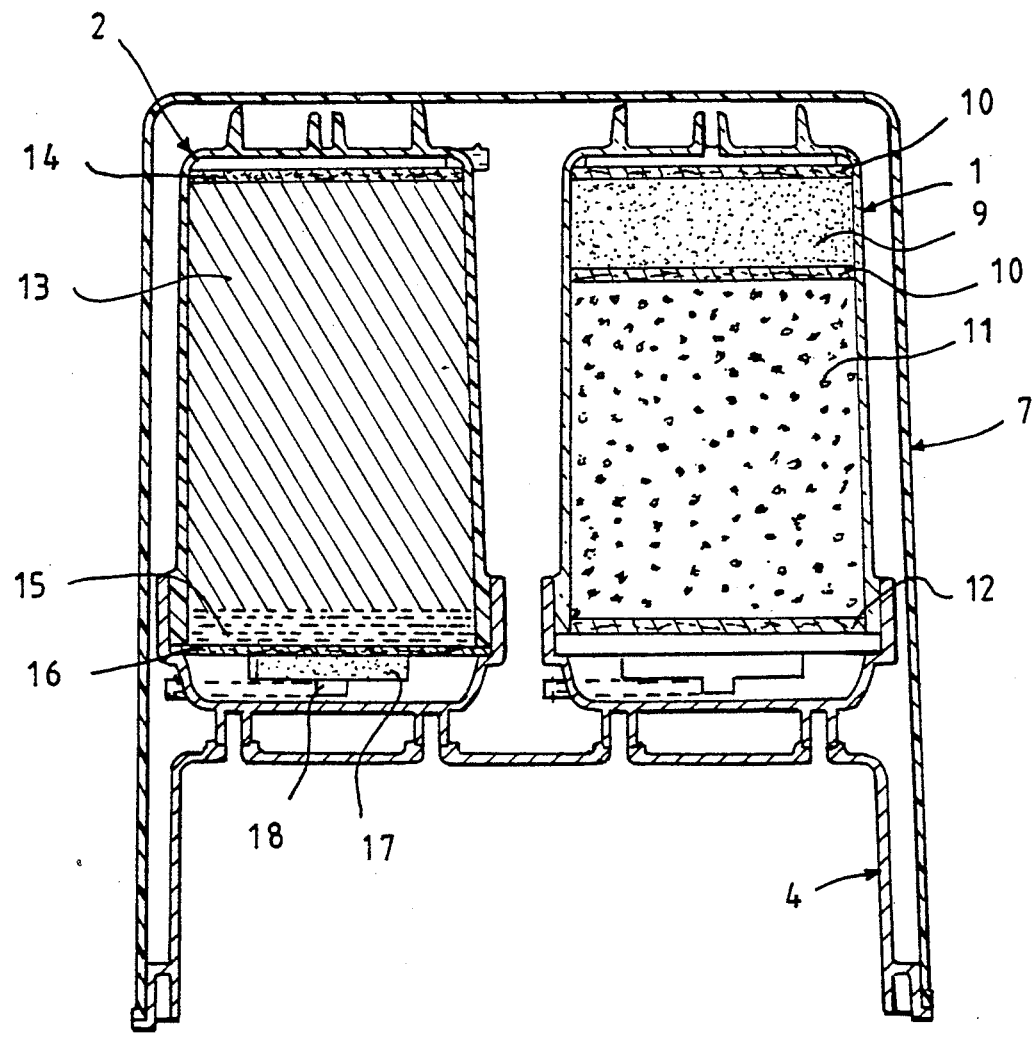
FIG. 2 is a vertical cross-sectional view of the preferred embodiment of FIG. 1.

An example of the preferred embodiment of the invention is shown in the drawings, FIGS. 1 and 2. This comprises two purification units in series, hermetically isolated during storage prior to use, and ancillary equipment.

The first unit (1), is a cylindrical polyethylene container, containing within it 25 ml of an iodated ion exchange resin disinfectant (9) confined on both sides by porous polyethylene filters (10) and 125 ml of activated bacteriostatic carbon granules (11), 12-30 mesh, followed by a fine hydrophillic polyethylene filter of 25-35μ pore size, 3.2 mm thick (12).

The second unit (2) comprises a similar container, connected to the first by a flexible inert tubing (3), containing 150 ml of an edible grade mixed bed ion exchanger in a humid state (13), composed of a highly activated strong base and strong acid resins, combined in a ratio of about 2:1 v/v so that a neutral pH solution is obtained upon addition of an excess of 3% NaCl solution. At the inlet before the resin layer, an inert porous layer (14) is provided followed at the exit by 10 ml of additional edible grade strong base resin (15), followed by a dense filter material (16), composed of activated carbon and inert binders, which limits the flow rate to 60-70 ml/min, such as a layer of Cyanamide carbon filter media 45/55 w. The unit is further provided with a layer, 3-4 mm in depth, containing 1.4 g (2 ml) of the dyed resin (17) made according to Example 8.

The unit is enclosed at the outlet by an inert porous plug (18).

The device is further provided with ancillary equipment including a stable base (4) an exit tube (5), receiving vessel (6), and feed reservoir (7), of 1.5 liter capacity providing a water head of about 25 cm above the exit tube and which reservoir also serves as a cover during storage.

The clamp (8) and tight fitting caps over the inlet and exit ports isolate the units during storage.

Figure 3:
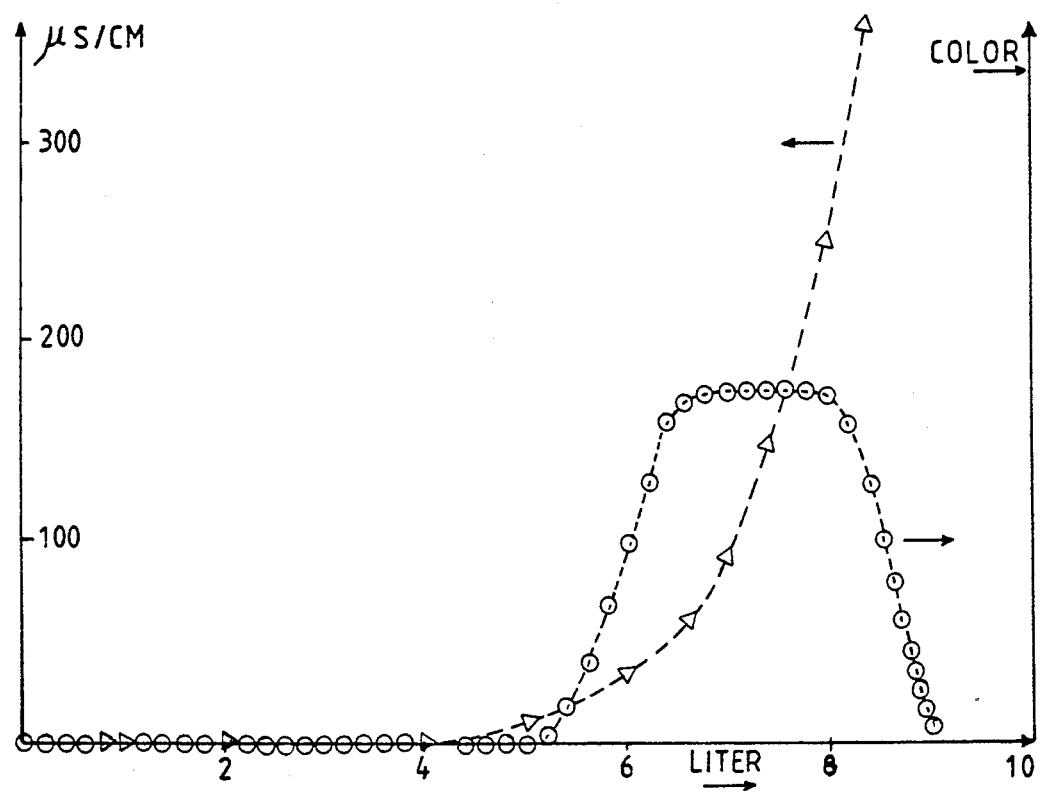
FIG. 3 is a graph of the performance of the preferred embodiment as disclosed in Example 10.

FIG. 3 shows the performance of the device of Example 10 in purifying high TDS water (625 ppm, 1000 μS/cm).

The horizontal line shows the volume in liters of said water, purified. The vertical line on the left shows electrical conductivity in μS/cm. The vertical line on the right shows relative color intensity. The broken line with triangular assignments relates to the conductivity scale, while the dotted line with circular assignments relates to color intensity.

Example 11

A dual chamber housing of 4 cm inner diameter equipped with inlet and outlet fitting, was filled with 60 ml of a strong base resin and 10 ml of the dye alumina lake of Example 1. When attached to a water purification device, producing 0.5 l/min of water of conductivity less than 1.0 μS/cm, (e.g. an ion exchange deionization column) the effluent water was unaffected. Upon system failure, the device imparted a strong blue color into the water, when the conductivity rose to 10 μS/cm.

Example 12

An aluminum lake was prepared as in Example 1, but with increased amounts of dye and aluminum nitrate, to give a 5% loading. 100 g of this lake was confined in a flow-through chamber enclosed with medium frits and equipped with inlet and exit fittings. When attached to a pumpless reverse osmosis system (e.g. an undersink residential reverse osmosis water purifier), providing 2 liters per minute of water of conductivity less than 100 μS/cm, no color was imparted to the water. Upon membrane failure and conductivity rising above 300 μS/cm, blue dye was released into the water.

Prototypes of UWP have been tested by external independent laboratories specializing in chemistry of water and of waste waters, and in radiation safety. Tests were conducted on 7 samples through each of which 8 liters of contaminated water were "filtered". The contaminants selected represent various families of common, toxic or radioactive contaminants.

The results obtained are summarized in the following Table:

| Type of Contaminant | General Family | Concentration, ppm | | | Average Purification % |
|---|---|---|---|---|---|
| | | Feed | Average Product | Maximum Product | |
| CN− | Industrial Wastes | 1 | 0 | 0 | 100 |
| A.B.S. | Detergents | 6.5 | 0 | 0 | 100 |
| Parathion | Organo-Phosphorous Pesticides | 0.6 | 0.00001 | 0.00004 | 99.999 |
| Cd++ | Heavy Metals Electoplating | 0.643 | 0.005 | 0.007 | 99.3 |
| Lindane | Chloro-Hydrocarbon Pesticides | 0.286 | 0.0033 | 0.013 | 98.9 |
| Phenol | Industrial Wastes | 0.737 | 0 | 0 | 100 |
| $^{131}I-$ | Radioactivity | *8 | *$6.4 \times 10^{-4}$ | *$1.83 \times 10^{-2}$ | 99.99 |

*Concentration expressed in μCi/liter.

Independent laboratory tests on biocidal material included in UWP showed that to can eliminate completely all common bacteria, viruses and harmful microorganisms including: *Escherichia coli, Pseodomonas aeruginosa, Staphylococcus aureus, Giardia lambloa, Vibrio cholerae,* Coxsackie virus, Polio virus, *Pseudomonas fluorescens* and *Streptococcus faecalis.*

The absolute purification (and desalination) capacity of UWP is inversely proportional to the salinity level of the feed water and amounts to 3.250 ppm TDS×liter ("ppm" means parts per million; "TDS" means Total Dissolved Solids).

The salinity level of many Tap Waters is 100-200 ppm TDS.

UWP can purify 16-32 liters (4-8 gallons) of such waters when contaminated by harmful or undesirable materials. The weight of absolutely purified water is, therefore, 32-64 times greater than the weight of UWP (weighing less than 0.05 kg) used for their purification.

If 1,000 ppm TDS brackish water are to be desalinated, the capacity of UWP would be 3.25 liters (0.86 gallons).

We claim:

1. Apparatus for removing harmful and distasteful organic and inorganic contaminants, or carrying out a purification from an excess salinity from water, comprising:
   a flow-through container having an inlet port and an exit port, said flow-through container including:
   a bed being a mixture of a strong base ion exchange resin and a strong acid ion exchange resin, wherein said strong base ion exchange resin is in a stoichiometrical excess of about 5-15% with respect to said strong acid ion exchange resin; and,
   color indicator means including a layer of neutral or weakly basic substrate supporting an artificial dye, said layer being located adjacent to the exit port of said flow-through container,
   whereupon exhaustion of said bed and with an increase of the pH of the water, said artificial dye is rapidly released, imparting a clearly visible color to the water.

2. The apparatus for carrying out a purification of water according to claim 1, wherein said color indicator means is an artificial dye lake adsorbed on a neutral matrix.

3. The apparatus for carrying out a purification of water according to claim 1, wherein said color indicator means is an artificial dye adsorbed on weak base exchange resin.

4. The apparatus for carrying out a purification of water according to claim 1, wherein said artificial dye is an artificial food dye.

5. A method for visually indicating an exhaustion of the desalination capacity of a water purification apparatus, comprising the step of:
   passing water from which excess salts are to be removed through a bed, said bed being a mixture of a strong base ion exchange resin and a strong acid ion exchange resin wherein said strong base ion exchange resin is in a stoichiometric excess of about 5-15% over said acid ion exchange resin; and,
   passing the water, after passage through said bed, through an adjacent layer of a neutral or weakly basic substrate supporting an artificial dye, said layer being located adjacent the exit port of said apparatus so that when said bed of said ion exchange resins becomes exhausted, thereby resulting in an increase of salt content and of pH, the water rapidly release said artificial dye providing a visible color indication of the exhaustion of the water purification apparatus having said ion exchange resins.

6. The method for visually indicating an exhaustion of the desalination capacity of a water purification apparatus according to claim 5, wherein said artificial dye is an artificial dye lake absorbed on a neutral carrier or on a weak base ion exchange resin.

7. The method for visually indicating an exhaustion of the desalination capacity of a water purification apparatus according to claim 5, wherein said artificial dye is an artificial dye adsorbed on a weak base ion exchange resin.

8. The method for visually indicating an exhaustion of the desalination capacity of a water purification apparatus according to claim 5, wherein said artificial dye is an artificial food dye.

* * * * *